United States Patent [19]

Komanduri et al.

[11] Patent Number: 4,584,649
[45] Date of Patent: Apr. 22, 1986

[54] METHOD FOR SELECTING AND IMPLEMENTING CUTTING CONDITIONS IN MACHINING A WORKPIECE

[75] Inventors: Ranga Komanduri, Schenectady; Charles R. Carder, Ballston Lake, both of N.Y.

[73] Assignee: General Electric Company, Schenectady, N.Y.

[21] Appl. No.: 621,322

[22] Filed: Jun. 15, 1984

[51] Int. Cl.[4] .................. G06F 15/46; G05B 19/18
[52] U.S. Cl. .................. 364/475; 318/568; 364/171; 364/191
[58] Field of Search .......... 364/474, 475, 167–171, 364/191–193, 511; 318/561, 568

[56] References Cited

U.S. PATENT DOCUMENTS

| | | | |
|---|---|---|---|
| 3,784,798 | 1/1974 | Beadle | 364/475 |
| 4,078,195 | 3/1978 | Mathias | 364/474 X |
| 4,208,718 | 6/1980 | Chung | 364/474 |
| 4,521,860 | 6/1985 | Kanematsu et al. | 364/171 |
| 4,530,046 | 7/1985 | Munekata | 364/171 |

Primary Examiner—Joseph Ruggiero
Attorney, Agent, or Firm—James Magee, Jr.; James C. Davis, Jr.

[57] ABSTRACT

An iterative method is described for operator selection and implementation of cutting conditions for the machining of a workpiece with a machine tool employing a tool insert.

14 Claims, 6 Drawing Figures

○      $d = 0.4 \times I.C$

▢      $d = 0.4 (I.C. - R) \cos SCEA$

▱ 80°   $d = 0.4 (I.C - R) \cos SCEA \times 0.85$

▱ 100°   $d = 0.4 (I.C - R) \cos SCEA \times 1.15$

△      $d = 0.4 \left(\frac{1.732}{2} I.C. - 2.6 R\right) \cos SCEA$

◇ 55°   $d = 0.4 \left(\frac{1.732}{2} I.C - 2.6R\right) \cos SCEA \times 0.85$

◇ 35°   $d = 0.4 \left(\frac{1.732}{2} (I.C.) - 2.6R\right) \cos SCEA \times 0.50$

CORNER ANGLE

METHOD FOR SELECTING AND IMPLEMENTING CUTTING CONDITIONS IN MACHINING A WORKPIECE

BACKGROUND OF THE INVENTION

This invention presents an improvement in the machining art by increasing the ability of the tool operator to select and implement reasonable cutting conditions for any of a variety of materials on machine tools of differing horsepower. This invention lends itself to either manually, or numerically, controlled machining. The term "numerical control" is considered herein as encompassing the control of the operation of a machine tool in response either to directions programmed in machine language on a reuseable programming medium (e.g., a punched tape, a magnetic tape, a floppy disk) or to directions stored in the memory of a computerized numerical control machine tool.

However, regardless of whether the machining has been manually controlled or numerically controlled, the selection of the cutting conditions has historically been done in a manner, which underutilizes the capabilities of the machine tool. Thus, directions given to a machine tool operator or introduced into a numerical control program by a programmer will, depending upon the type of machining operation being performed, the material being machined, its hardness and condition and the material of the cutting tool, be based upon recommended values for speed, feed and depth of cut (DOC). These recommended values [as well as selection of cutting fluid, tool geometry (i.e., tool attitude relative to the workpiece) and general information for calculating the power required for the particular operation] are determined from handbooks, such as the *Machining Data Handbook* [2nd Edition, Machining Data Center, Metcut Research Associates Inc., Cincinnati, Ohio (1972)]. Such an approach has built-in rigidity and the values for speed, feed and DOC provided in this way are, unfortunately, unnecessarily conservative and can result in severe underutilization of the machine tool. The problem is compounded by the fact that many part-programmers (i.e., individuals charged with programming the machining of a part to be made) are not skilled in machining technology.

The process of this invention addresses the present problem of machine tool underutilization by enabling the iterative determination of cutting conditions for the particular machining operation (i.e., roughing or finishing) that will, while satisfying certain constraints, more fully utilize the machine tool selected. Further, this process, although it employs simple calculations for the determination of feed and DOC such that a trained operator can carry out the requisite computations and manually adjust the machine tool as appropriate, offers in the case of a numerically controlled machine tool the highly desirable option of placing the programming task in the hands of the machine tool operator.

Thus, the iterative method of this invention for selecting and implementing the cutting conditions for each of a series of machining operations to be executed in sequence to manufacture a given part can be made part of an overall computer-aided process. In such a process, once a part has been designed, the machine tool operator charged with producing the part can draw the part (or component thereof) using interactive graphics, divide the part into elements, select the sequence of machining operations, select the cutting conditions, write a numerical control program and then execute it with the machining operations being carried out by the machine tool in accordance with the program. It is expected that in addition to the advantage of better machine tool utilization, the placement of the aforementioned tasks under the control of the machine tool operator will result in increased productivity and reduced costs.

DESCRIPTION OF THE INVENTION

An iterative method is provided by which a machine tool operator can determine those values for feed and DOC that are consistently effective in the machining of any of a variety of materials on different size machine tools. Once the constraints defined herein have been applied, settings for the resulting values of feed and DOC can be imposed on the machine tool manually by the operator via means for adjusting the feed and means for adjusting DOC. Alternatively, in place of employing manual adjustment of feed and DOC, these adjusting means may be automatically repositioned via control devices responsive to a programming medium, such as a numerical control tape prepared in, or converted to, machine language. The medium programmed with the final feed and DOC data for the part to be machined is downloaded to a controller at the machine to set the cutting conditions for a given number of passes to produce a given change in workpiece configuration.

The method is carried out in iterative fashion by applying a series of constraints fixing maximum and minimum feeds and maximum and minimum DOC-to-feed ratios. Final feed and DOC are determined so as to satisfy the constraints with no change in horsepower (HP) requirements. For satisfying the conditions imposed the final feed ($f_f$) should be equal to $\sqrt{d_i f_i / L}$ and final DOC ($d_f$) should be equal to $\sqrt{d_i f_i L}$ where $L = (d/f)_{max}$ and $f_i$ and $d_i$ are the initial feed and initial DOC, respectively, selected after satisfying the minimum (or maximum) feed criterion and the HP requirement.

To initiate determination of the feed and DOC for turning, milling, boring or other operation, certain data must be selected or calculated to enable the calculation of the first approximation of feed from the formula:

$$f = \frac{HP_c}{V \times 12 \times d \times uhp}$$

where $HP_c$ is the horsepower at the cutting edge of the tool insert

V is the cutting speed d is the first approximation of DOC and uhp is the unit horsepower $HP_c$ will have a value much smaller than the motor horsepower with the difference representing transmission losses and the power needed to offset the additional load imposed as the tool insert wears. The value of f determined as a first approximation is then compared to the allowable range of values of feed bracketed by $f_{min}$ (the smallest allowable value for feed) and $f_{max}$ (the largest allowable value for feed). The type of machining operation (i.e., rough or finish) is determinative of the feed constraint. Thus, $f_{min}$ is dependent on the value of the minimum cut such that any smaller cut will result in excessive rubbing between the tool and the workpiece and $f_{max}$ is related to the permissible roughness of the surface produced. The value of the former depends upon both the nose radius of the tool insert and the side cutting edge angle (SCEA); the value of the latter on the nose radius (R) of the tool insert (i.e., feed is proportional to $\sqrt{R \times R_a}$, where $R_a$ is the arithmetic average of the finish required).

If f is less than $f_{min}$, then the value of f is increased to the value of $f_{min}$ and this becomes the initial value of feed, $f_i$. The value of d (first approximation of DOC) will have been determined based on shape of the cutting insert to be used, diameter of the circle that can be inscribed on the insert viewed in plan, the nose radius and the SCEA at which the insert is to be used.

Next, an initial value ($d_i$) of d is set using the relationship:

$d_i f_i = df$ where the value of $f_i$ is $f_{min}$
$d_i = df/f_{min}$.

The value of $d_i$ is used to calculate ($d_i/f_i$) for application of the next criterion, the allowable range of pre-set DOC-to-feed ratios. If $(d_i/f_i) > (d/f)_{max}$, then the value of feed tentatively considered the final value ($f_f$) is obtained by increasing the value of $f_i$ using the relationship:

$$f_f = \sqrt{\frac{d_i f_i}{L}}$$

where L is $(d/f)_{max}$ and the value of DOC tentatively considered the final value ($d_f$) is obtained by decreasing $d_i$ using the relationship:

$$d_f = \sqrt{d_i f_i L}$$

where L is $(d/f)_{max}$.

If the first approximation of feed (f) is greater than $f_{max}$, then the value of f is reduced to the value of $f_{max}$ and this becomes the initial value of feed, $f_i$.

Next, the value of $d_i$ is determined from the relationship:

$d_i f_i = df$ where the value of $f_i$ is $f_{max}$
$d_i = df/f_{max}$ and d has the value of its first approximation If $(d/f_i)$ has a value less than $(d/f)_{min}$, $(d/f_i)$ is given the value of $(d/f)_{min}$. Because the previous condition applies, d is equal to $d_{max}$ and cannot have a greater value. It is, therefore, necessary to decrease the value of the feed further such that $f_f = d/(d/f)_{min}$. The final DOC ($d_f$) has the value of d.

If the value of the first approximation of feed (f) is equal to or greater than $f_{min}$ and is equal to or less than $f_{max}$ and if the first value of the DOC-to-feed ratio is equal to or greater than $(d/f_{min})$ and is equal to or less than $(d/f_{max})$, then no change in the values of f and d is needed.

In case it was necessary to reduce f (as where f was greater than $f_{max}$ or where $(d/f_i)$ had a value less than $(d/f)_{min}$, the horsepower available at the cutting edge of the insert will not be used to the fullest extent, if these values of feed and DOC are used. If the cutting insert is capable of use in the machining operation at a higher speed (e.g., when aluminum is being machined with a carbide tool insert) and if the machine is capable of operating at a higher speed (V), the operator has the option of doing so. If the option of operating at higher speed is selected, then the foregoing analysis is repeated with the new value of V.

Next, knowing the thickness of stock to be removed from the workpiece ($d_s$) and the final DOC ($d_f$) the requisite number of machining passes can be determined (number of passes $= d_s/d_f$). If the value so determined does not have an integer value, then the number of passes should be increased to the next larger integer number and a new DOC ($d_{new}$) and new feed ($f_{new}$) are determined. The new feed is either $d_{new}/(d/f)_{min}$ or $d_f f_f/d_{new}$, whichever is smaller. However, $f_{new}$ should not be less than $f_{min}$ or greater than $f_{max}$. Under extreme conditions, i.e., when $f_{new}$ is less than $f_{min}$ or greater than $f_{max}$, it is possible that $d_{new}/f_{new}$ can be less than $(d/f)_{min}$ or greater than $(d/f)_{max}$. This result would violate the general rule that the DOC-to-feed ratio should be equal to or greater than $(d/f)_{min}$ and equal to or less than $(d/f)_{max}$. It then becomes a matter of operator judgment as to whether the deviation from the general rule would result in detrimental effects.

Having arrived at realistic values for the feed and the DOC to be used, the operator can now reposition the DOC to reflect the operating conditions selected and proceed with the machining operation. In place of employing manual adjustment, if the machine tool is so equipped, these adjusting means could be automatically repositioned once the operator has introduced this operating information into the machining program. With conventional numerical control this is accomplished by having the operator generate the program for machining on numerical control tape, verify the accuracy of the punched tape and then feed the properly punched tape into the controller, which executes the program by actuating servo units that reposition the aforementioned adjusting means. Similarly, in the case of the more advanced computerized numerical control the data on feed and DOC is stored (usually by reading a punched tape) as part of the machining program in a memory residing in the machine tool. When the system is actuated, the program downloads to the controller for execution of the program including actuating of the servo units that reposition the means for setting feed and DOC.

By this invention it now becomes feasible to incorporate in the software of the controller the knowledge of the process planner, the production engineer and the part-programmer and supplement this data with the operator's experience in the determination of the most feasible cutting conditions.

BRIEF DESCRIPTION OF THE DRAWING

The features of this invention believed to be novel and unobvious over the prior art are set forth with particularity in the appended claims. The invention itself, however, as to the organization, method of operation and objects and advantages thereof, may best be understood by reference to the following description taken in conjunction with the accompanying drawing wherein:

MANNER AND PROCESS OF MAKING AND USING THE INVENTION

Determining The Horsepower Required At The Cutting Edge Of The Insert

Reference to the data (e.g., Machine Characteristics Table) supplied by the machine tool manufacturer will provide the horsepower of the machine tool (HP) and the machine utilization factor ($\eta$) based on continuous operation. A typical value for $\eta$ is 80%. The product of these two quantities (HP $\times \eta$) provides a measure of the horsepower available at the spindle.

Next, the tool wear correction factor ($C_w$) is determined from the relationship:

$$C_w = 1 + \left(0.1 \times \frac{\text{Tool wear criterion}}{0.010}\right)$$

This expression is based on the assumption that the expenditure of cutting force increases by 10% for every 0.010 inch of flank wear on the tool insert. An exemplary source of data for the tool wear criterion is TABLE I, which is an excerpt from page 212 of the text "The Machining of Metals" by Armarego and Brown [Prentice-Hall, Inc. (1969)]. Similar data can be obtained in other machining textbooks or from handbooks such as the aforementioned Machining Data Handbook.

TABLE I

| w (inches)* | Tool | Remarks |
|---|---|---|
| 0.030 | Cemented carbide | Roughing passes |
| 0.010–0.015 | Cemented carbide | Finishing passes |
| 0.060 or total destruction | H.S.S. | Roughing passes |
| 0.010–0.015 | H.S.S. | Finishing passes |
| 0.010–0.015 | Cemented oxides | Roughing and finishing passes |

*Maximum tolerable flank wear, i.e., the tool wear criterion.

The tool wear criterion is a reflection of the tool wear that can be tolerated for a given machining operation using a given tool insert material.

With the above information the horsepower at the cutting edge ($HP_c$) can be calculated from the following relationship:

$$HP_c = HP \times \eta / C_w$$

Determining The First Approximation Of DOC (d)

Figures 1, 6:
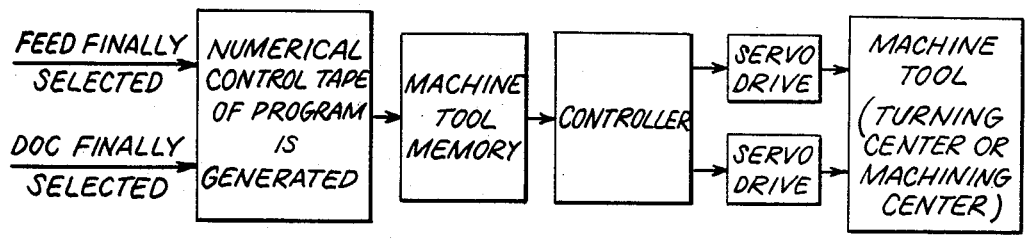
FIG. 1 is a tool table setting forth the formulas for determining the first approximation of DOC for a series of commonly used tool inserts shapes.
FIG. 6 is a flow diagram schematically representing the sequence by which feed and DOC adjustments are implemented when computerized numerical control is employed.
Figure 4:
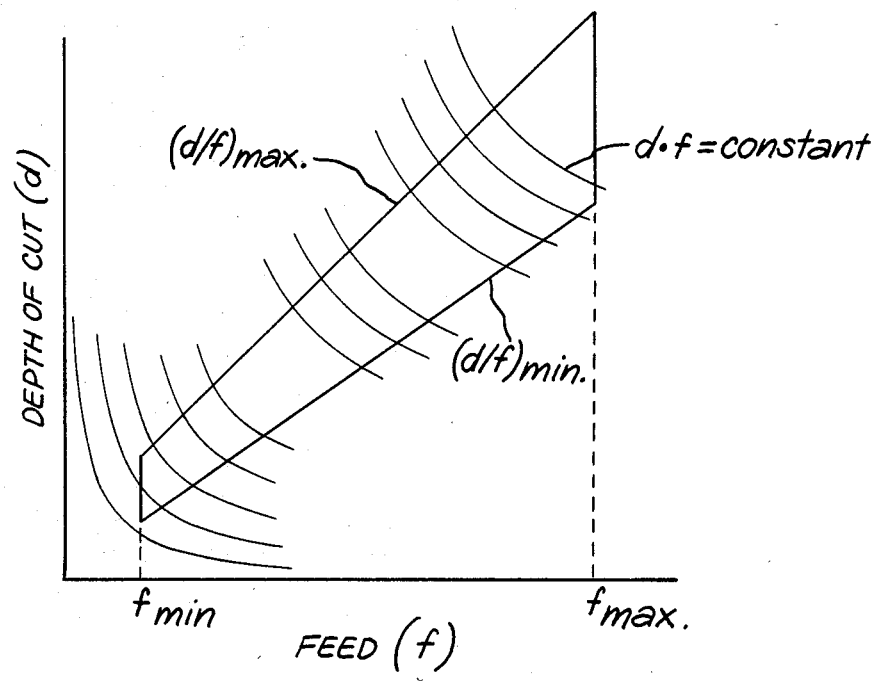
FIG. 4 is representative of the manner in which ranges of feed and DOC-to-feed ratios representing the constraints applied in the practice of this invention are graphically displayed.

Formulas for the determination of DOC are displayed in FIG. 1 of the drawings and the appropriate formula is applied once the tool insert to be used has been selected. The terms found in FIG. 1 have the following meanings:

I.C. is the diameter of the circle that can be inscribed on the insert viewed in plan;

R is the nose radius and

SCEA is the side cutting edge angle.

The various tool insert shapes in FIG. 1 are set forth in hierarchical order of preference. Thus, use of the circular shape tool insert is most preferred (if it can be used in a specific machining operation) relative to the use of any of the succeeding shapes. If the circular shape cannot be used, then the next succeeding shape, the square insert is considered and so forth.

Figure 2:
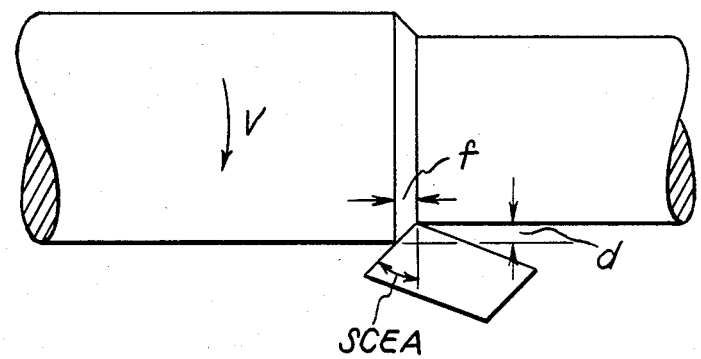
FIG. 2 is a schematic view in plan of a rotating workpiece being machined showing the tool insert positioning relative thereto.
Figure 3:
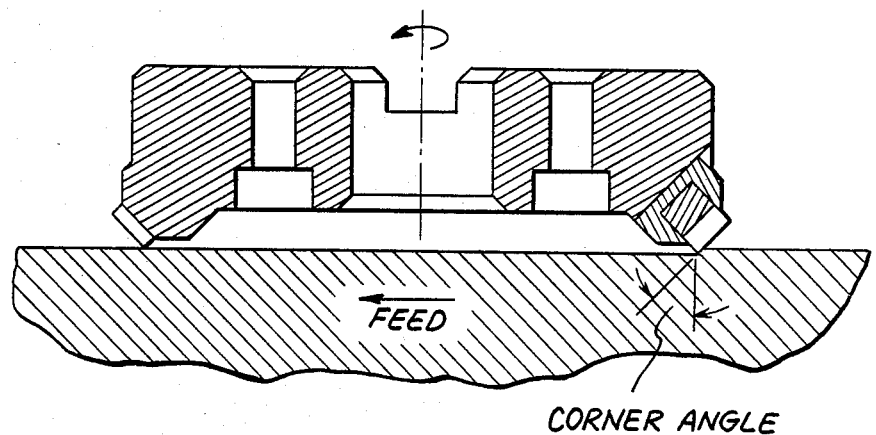
FIG. 3 is a schematic view partially in section showing cutter and tool insert positioning in a milling operation.

The value of SCEA to be used is to be set by the operator based on information supplied by the tool insert manufacturer. Its relationship to feed and DOC (i.e., d) in a turning operation is shown in FIG. 2. It is generally preferable to use the maximum recommended SCEA. However, the exact value may depend on the geometry of the portion of the part being machined. In the case of a milling operation the value of the corner angle (shown in FIG. 3) serves as the SCEA. The value of R is also provided by the tool insert manufacturer.

By way of example, the DOC for a given tool would be calculated as follows:

Shape: square
Size: ½" square × 3/16" thick
Nose rad, R: 3/64"
SCEA: 15 degrees

After selecting the appropriate formula from FIG. 1, calculation of the DOC follows:

$$d = 0.4(\text{I.C.} - R)\cos\text{SCEA}$$

$$d = 0.4(0.5 - 3/64)\cos 15°$$

$$d = 0.175 \text{ in.}$$

Calculating The First Approximation Of Feed (f)

$$f = \frac{HP \times \eta}{C_w} / (V \times 12 \times d \times uhp)$$

The value of uhp varies with the type and hardness of the material being machined as is shown in TABLES II, III and IV [all excerpts from page 53 of the Milling Handbook of High-Efficiency Metal Cutting published by the Carboloy Systems Department of the General Electric Company]. These tables are merely offered as representative of the type of information generally available from manufacturers of tool inserts and tool holders and in machining handbooks. Numbers given in the vertical columns of TABLE II for the various hardnesses are uhp values. When machining such materials, as cutting speed increases up to a critical value, the magnitude of the uhp factor is reduced. Increasing the cutting speed beyond this critical cutting speed will not significantly affect the uhp value.

The value of V can be the value recommended by the tool insert manufacturer or may be a value arrived at by the machine tool operator based on proven tool life and total cost. Cutting speed V can range as high as the critical value, but is usually a somewhat lower value.

TABLE II

| FERROUS METALS AND ALLOYS | | | | | | |
|---|---|---|---|---|---|---|
| | BRINNEL HARDNESS NUMBER | | | | | |
| | 150–175 | 176–200 | 201–250 | 251–300 | 301–350 | 351–400 |
| A.I.S.I | | | | | | |
| 1010–1025 | .58 | .67 | — | — | — | — |
| 1030–1055 | .58 | .67 | .80 | .96 | — | — |
| 1060–1095 | — | — | .75 | .88 | 1.0 | — |

TABLE II-continued
FERROUS METALS AND ALLOYS

| | BRINELL HARDNESS NUMBER | | | | | |
|---|---|---|---|---|---|---|
| | 150–175 | 176–200 | 201–250 | 251–300 | 301–350 | 351–400 |
| 1112–1120 | .50 | — | — | — | — | — |
| 1314–1340 | .42 | .46 | .50 | — | — | — |
| 1330–1350 | — | .67 | .75 | .92 | 1.1 | — |
| 2015–2115 | .67 | — | — | — | — | — |
| 2315–2335 | .54 | .58 | .62 | .75 | .92 | 1.0 |
| 2340–2350 | — | .50 | .58 | .70 | .83 | — |
| 2512–2515 | .50 | .58 | .67 | .80 | .92 | — |
| 3115–3130 | .50 | .58 | .70 | .83 | 1.0 | 1.0 |
| 3160–3450 | — | .50 | .62 | .75 | .87 | 1.0 |
| 4130–4345 | — | .46 | .58 | .70 | .83 | 1.00 |
| 4615–4820 | .46 | .50 | .58 | .70 | .83 | .87 |
| 5120–5150 | .46 | .50 | .62 | .75 | .87 | 1.0 |
| 52100 | — | .58 | .67 | .83 | 1.0 | — |
| 6115–6140 | .46 | .54 | .67 | .83 | 1.0 | — |
| 6145–6195 | — | .70 | .83 | 1.0 | 1.2 | 1.3 |
| PLAIN CAST IRON | .30 | .33 | .42 | .50 | — | — |
| ALLOY CAST IRON | .30 | .42 | .54 | — | — | — |
| MALLEABLE IRON | .42 | — | — | — | — | — |
| CAST STEEL | .62 | .67 | .80 | — | — | — |

TABLE III
NON-FERROUS METALS AND ALLOYS

| | uhp |
|---|---|
| BRASS: | |
| HARD | .83 |
| MEDIUM | .50 |
| SOFT | .33 |
| FREE MACHINING | .25 |
| BRONZE | |
| HARD | .83 |
| MEDIUM | .50 |
| SOFT | .33 |
| COPPER (PURE) | .90 |
| ALUMINUM | |
| CAST | .25 |
| HARD (ROLLED) | .33 |
| MONEL (ROLLED) | 1.0 |
| ZINC ALLOY (DIE CAST) | .25 |

TABLE IV
HIGH TEMPERATURE ALLOYS

| MATERIAL CLASSIFICATION | BRINELL HARDNESS NUMBER | uhp |
|---|---|---|
| A 286 | 165 | .82 |
| A 286 | 285 | .93 |
| CHROMOLOY | 200 | .78 |
| CHROMOLOY | 310 | 1.18 |
| HASTELLOY-B | 230 | 1.10 |
| INCO 700 | 330 | 1.12 |
| INCO 702 | 230 | 1.10 |
| M-252 | 230 | 1.10 |
| M-252 | 310 | 1.20 |
| TI-150A | 340 | .65 |
| U-500 | 375 | 1.10 |
| 4340 | 200 | .78 |
| 4340 | 340 | .93 |

Calculating The Final Feed ($f_f$) And Final DOC

Essential to the arrival at final feed and final DOC is the fixing of constraints for these parameters to be met for the given machining operation. These constraints (which depend upon the work material and type of machining operation, i.e., roughing or finishing and are qualitatively illustrated graphically in FIG. (4) are fixed by the operator. An exemplary set of constraints for $f_{min}$, $f_{max}$, $(d/f)_{min}$ and $(d/f)_{max}$ for rough turning is as follows:

Max feed: 0.025 inch/revolution (ipr)
Min feed: 0.005 ipr
Max (d/f): 15
Min (d/f): 10

Two alternate routes can be taken to arrive at values of final feed ($f_f$) and final DOC ($d_f$). If a table has been generated taking into account the size (i.e., horsepower) of the machine tool being used and its utilization factor, the material to be machined (i.e., work material), the tool insert material under consideration, the proposed cutting speed (V) and the constraints on feed and DOC for the kind of machining (i.e., rough or finish), then it is merely necessary to refer to the table and select the values for final feed and DOC already calculated. TABLES V through XIV are examples of such prepared tables setting forth reasonable values for $f_f$ and $d_f$. Seven sizes of machine tools and six work materials are considered and values for each of four of these work materials are provided at two machining speeds. The data in these tables typifies the use of two different types of tool insert material (i.e., cemented tungsten carbide and ceramic).

Manifestly, if an appropriate table is not available it is necessary to carry out the calculation sequence described hereinabove given the first approximation values of feed and DOC (i.e., thereafter finding $f_i$ and $d_i$; $d_i/f_i$ and finally $f_f$ and $d_f$ while adhering to the established constraints).

TABLE V

| WORK MATERIAL: | 6061 T6 Aluminum | | | | uhp: 0.3 | | |
|---|---|---|---|---|---|---|---|
| CUTTING SPEED: | 1200 sfm | | | | TOOL MATERIAL: Carbide | | |
| | SIZE OF MACHINE TOOL | | | | | | |
| | (a) | (b) | (c) | (d) | (e) | (f) | (g) |
| HP | 7.5 | 15.0 | 30.0 | 40.0 | 50.0 | 75.0 | 100. |
| HP × η | 6.0 | 12.0 | 24.0 | 32.0 | 40.0 | 60.0 | 80.0 |
| $\frac{HP \times \eta}{C_w}$ | 4.6 | 9.23 | 18.46 | 24.62 | 30.77 | 46.15 | 61.54 |
| f | 0.006 | 0.0122 | 0.0244 | 0.0326 | 0.0407 | 0.0610 | 0.0814 |
| d | 0.175 | 0.175 | 0.175 | 0.175 | 0.175 | 0.175 | 0.175 |
| $\left(\frac{d}{f}\right)$ | 29.17 | 14.33 | 7.17 | 5.37 | 4.30 | 2.87 | 2.15 |
| $f_{final}$ | 0.0084 | No | 0.0175 | 0.0175 | 0.0175 | 0.0175 | 0.0175 |

TABLE V-continued

| WORK MATERIAL: | 6061 T6 Aluminum | | | | uhp: 0.3 | | |
|---|---|---|---|---|---|---|---|
| CUTTING SPEED: | 1200 sfm | | | | TOOL MATERIAL: Carbide | | |
| | SIZE OF MACHINE TOOL | | | | | | |
| | (a) | (b) | (c) | (d) | (e) | (f) | (g) |
| $d_{final}$ | 0.1255 | change required | 0.175 | 0.175 | 0.175 | 0.175 | 0.175 |
| $\left(\dfrac{d}{f}\right)$ final | 15 | | 10 | 10 | 10 | 10 | 10 |

TABLE VI

| WORK MATERIAL: | 6061 T6 Aluminum | | | | uhp: 0.3 | | |
|---|---|---|---|---|---|---|---|
| CUTTING SPEED: | 2400 sfm | | | | TOOL MATERIAL: Carbide | | |
| | SIZE OF MACHINE TOOL | | | | | | |
| | (a) | (b) | (c) | (d) | (e) | (f) | (g) |
| HP | 7.5 | 15.0 | 30.0 | 40.0 | 50.0 | 75.0 | 100. |
| HP × η | 6.0 | 12.0 | 24.0 | 32.0 | 40.0 | 60.0 | 80.0 |
| $\dfrac{HP \times \eta}{C_w}$ | 4.6 | 9.23 | 18.46 | 24.62 | 30.77 | 46.15 | 61.54 |
| f | 0.003 | 0.0061 | 0.0122 | 0.0163 | 0.0203 | 0.0305 | 0.0407 |
| d | 0.175 | 0.175 | 0.175 | 0.175 | 0.175 | 0.175 | 0.175 |
| $\left(\dfrac{d}{f}\right)$ | 58.3 | 28.69 | 14.34 | 10.74 | 8.62 | 5.74 | 4.30 |
| $f_{final}$ | 0.0059 | 0.00844 | No change required | No change required | 0.0175 | 0.0175 | 0.0175 |
| $d_{final}$ | 0.0887 | 0.1265 | | | 0.175 | 0.175 | 0.175 |
| $\left(\dfrac{d}{f}\right)$ final | 15 | 15 | | | 10 | 10 | 10 |

TABLE VII

| WORK MATERIAL | AISI 1045 Steel (200 Bhn) | | | | uph: 0.83 | | |
|---|---|---|---|---|---|---|---|
| CUTTING SPEED: | 500 sfm | | | | TOOL MATERIAL: Carbide | | |
| | SIZE OF MACHINE TOOL | | | | | | |
| | (a) | (b) | (c) | (d) | (e) | (f) | (g) |
| HP | 7.5 | 15.0 | 30.0 | 40.0 | 50.0 | 75.0 | 100. |
| HP × η | 6.0 | 12.0 | 24.0 | 32.0 | 40.0 | 60.0 | 80.0 |
| $\dfrac{HP \times \eta}{C_w}$ | 4.6 | 9.23 | 18.46 | 24.62 | 30.77 | 46.15 | 61.54 |
| f | 0.005 | 0.011 | 0.021 | 0.028 | 0.035 | 0.053 | 0.071 |
| d | 0.175 | 0.175 | 0.175 | 0.175 | 0.175 | 0.175 | 0.175 |
| $\left(\dfrac{d}{f}\right)$ | 33.14 | 16.53 | 8.33 | 6.18 | 4.96 | 3.3 | 2.48 |
| $f_{final}$ | 0.00764 | 0.0133 | 0.0175 | 0.0175 | 0.0175 | 0.0175 | 0.0175 |
| $d_{final}$ | 0.1146 | 0.1699 | 0.175 | 0.175 | 0.175 | 0.175 | 0.175 |
| $\left(\dfrac{d}{f}\right)$ final | 15 | 15 | 10 | 10 | 10 | 10 | 10 |

TABLE VIII

| WORK MATERIAL: | AISI 1045 Steel (200 Bhn) | | | | uph: 0.83 | | |
|---|---|---|---|---|---|---|---|
| CUTTING SPEED: | 1000 sfm | | | | TOOL MATERIAL: Alumina-coated Carbide | | |
| | SIZE OF MACHINE TOOL | | | | | | |
| | (a) | (b) | (c) | (d) | (e) | (f) | (g) |
| HP | 7.5 | 15.0 | 30.0 | 40.0 | 50.0 | 75.0 | 100. |
| HP × η | 6.0 | 12.0 | 24.0 | 32.0 | 40.0 | 60.0 | 80.0 |
| $\dfrac{HP \times \eta}{C_w}$ | 4.6 | 9.23 | 18.46 | 24.62 | 30.77 | 46.15 | 61.54 |
| f | 0.0026 | 0.0053 | 0.0106 | 0.014 | 0.0177 | 0.0265 | 0.0353 |
| d | 0.175 | 0.175 | 0.175 | 0.175 | 0.175 | 0.175 | 0.175 |
| $\left(\dfrac{d}{f}\right)$ | 6.29 | 33 | 16.51 | 12.5 | 9.89 | 6.60 | 4.96 |

TABLE VIII-continued

WORK MATERIAL: AISI 1045 Steel (200 Bhn)  uph: 0.83
CUTTING SPEED: 1000 sfm  TOOL MATERIAL: Alumina-coated Carbide

| | SIZE OF MACHINE TOOL | | | | | | |
|---|---|---|---|---|---|---|---|
| | (a) | (b) | (c) | (d) | (e) | (f) | (g) |
| $f_{final}$ | 0.0055 | 0.00786 | 0.01112 | No change required | 0.0175 | 0.0175 | 0.0175 |
| $d_{final}$ | 0.0826 | 0.1180 | 0.1668 | | 0.175 | 0.175 | 0.175 |
| $\left(\dfrac{d}{f}\right)_{final}$ | 15 | 15 | 10 | | 10 | 10 | 10 |

TABLE IX

WORK MATERIAL: AISI 4340 Steel (300 Bhn)  uph: 1.51
CUTTING SPEED: 600 sfm  TOOL MATERIAL: Alumina-coated Carbide

| | SIZE OF MACHINE TOOL | | | | | | |
|---|---|---|---|---|---|---|---|
| | (a) | (b) | (c) | (d) | (e) | (f) | (g) |
| HP | 7.5 | 15.0 | 30.0 | 40.0 | 50.0 | 75.0 | 100. |
| HP × η | 6.0 | 12.0 | 24.0 | 32.0 | 40.0 | 60.0 | 80.0 |
| $\dfrac{HP \times \eta}{C_w}$ | 4.6 | 9.23 | 18.46 | 24.62 | 30.77 | 46.15 | 61.54 |
| f | 0.0024 | 0.0049 | 0.0097 | 0.0129 | 0.0162 | 0.0243 | 0.0323 |
| d | 0.175 | 0.175 | 0.175 | 0.175 | 0.175 | 0.175 | 0.175 |
| $\left(\dfrac{d}{f}\right)$ | 72.31 | 36.08 | 18.04 | 13.52 | 10.82 | 7.21 | 5.42 |
| $f_{final}$ | 0.00529 | 0.00756 | 0.0106 | No change required | No change required | 0.0175 | 0.0175 |
| $d_{final}$ | 0.07937 | 0.1134 | 0.1596 | | | 0.175 | 0.175 |
| $\left(\dfrac{d}{f}\right)_{final}$ | 15 | 15 | 15 | | | 10 | 10 |

TABLE X

WORK MATERIAL: Gray Cast Iron (250 Bhn)  uph: 0.72
CUTTING SPEED: 500 sfm  TOOL MATERIAL: Carbide

| | SIZE OF MACHINE TOOL | | | | | | |
|---|---|---|---|---|---|---|---|
| | (a) | (b) | (c) | (d) | (e) | (f) | (g) |
| HP | 7.5 | 15.0 | 30.0 | 40.0 | 50.0 | 75.0 | 100. |
| HP × η | 6.0 | 12.0 | 24.0 | 32.0 | 40.0 | 60.0 | 80.0 |
| $\dfrac{HP \times \eta}{C_w}$ | 4.6 | 9.23 | 18.46 | 24.62 | 30.77 | 46.15 | 61.54 |
| f | 0.0061 | 0.0122 | 0.0244 | 0.0326 | 0.0407 | 0.0610 | 0.08140 |
| d | 0.175 | 0.175 | 0.175 | 0.175 | 0.175 | 0.175 | 0.175 |
| $\left(\dfrac{d}{f}\right)$ | 28.78 | 14.34 | 7.17 | 5.37 | 4.3 | 2.87 | 2.15 |
| $f_{final}$ | 0.00843 | no change required | 0.0175 | 0.0175 | 0.0175 | 0.0175 | 0.0175 |
| $d_{final}$ | 0.1265 | | 0.175 | 0.175 | 0.175 | 0.175 | 0.175 |
| $\left(\dfrac{d}{f}\right)_{final}$ | 15 | | 10 | 10 | 10 | 10 | 10 |

TABLE XI

WORK MATERIAL: Gray Cast Iron (250 Bhn)  uph: 0.72
CUTTING SPEED: 1500 sfm  TOOL MATERIAL: Alumina-TiC or Si₃N₄ Ceramic

| | SIZE OF MACHINE TOOL | | | | | | |
|---|---|---|---|---|---|---|---|
| | (a) | (b) | (c) | (d) | (e) | (f) | (g) |
| HP | 7.5 | 15.0 | 30.0 | 40.0 | 50.0 | 75.0 | 100. |
| HP × η | 6.0 | 12.0 | 24.0 | 32.0 | 40.0 | 60.0 | 80.0 |
| $\dfrac{HP \times \eta}{C_w}$ | 4.6 | 9.23 | 18.46 | 24.62 | 30.77 | 46.15 | 61.54 |

TABLE XI-continued

WORK MATERIAL: Gray Cast Iron (250 Bhn)    uhp: 0.72
CUTTING SPEED: 1500 sfm    TOOL MATERIAL: Alumina-TiC or Si$_3$N$_4$ Ceramic

SIZE OF MACHINE TOOL

| | (a) | (b) | (c) | (d) | (e) | (f) | (g) |
|---|---|---|---|---|---|---|---|
| f | 0.0020 | 0.0040 | 0.0081 | 0.01091 | 0.01360 | 0.0204 | 0.0271 |
| d | 0.175 | 0.175 | 0.175 | 0.175 | 0.175 | 0.175 | 0.175 |
| $\left(\dfrac{d}{f}\right)$ | 86.21 | 43.0 | 21.5 | 16.13 | 12.91 | 8.6 | 6.46 |
| $f_{final}$ | 0.005 | 0.0068 | 0.0097 | 0.0113 | No change required | 0.0175 | 0.0175 |
| $d_{final}$ | 0.07 | 0.1025 | 0.1458 | 0.1692 | | 0.175 | 0.175 |
| $\left(\dfrac{d}{f}\right)$ final | 14 | 15 | 15 | 15 | | 10 | 10 |

TABLE XII

WORK MATERIAL: 302 Stainless Steel (Austenitic) (162 Bhn)    uhp: 1.13
CUTTING SPEED: 400 sfm    TOOL MATERIAL: Carbide

SIZE OF MACHINE TOOL

| | (a) | (b) | (c) | (d) | (e) | (f) | (g) |
|---|---|---|---|---|---|---|---|
| HP | 7.5 | 15.0 | 30.0 | 40.0 | 50.0 | 75.0 | 100. |
| HP × η | 6.0 | 12.0 | 24.0 | 32.0 | 40.0 | 60.0 | 80.0 |
| $\dfrac{HP \times \eta}{C_w}$ | 4.6 | 9.23 | 18.46 | 24.62 | 30.77 | 46.15 | 61.54 |
| f | 0.0049 | 0.0097 | 0.0195 | 0.0259 | 0.0324 | 0.0486 | 0.0648 |
| d | 0.175 | 0.175 | 0.175 | 0.175 | 0.175 | 0.175 | 0.175 |
| $\left(\dfrac{d}{f}\right)$ | 36 | 18 | 9 | 6.76 | 5.4 | 3.6 | 2.7 |
| $f_{final}$ | 0.0097 | 0.0106 | 0.0175 | 0.0175 | 0.0175 | 0.0175 | 0.0175 |
| $d_{final}$ | 0.1134 | 0.1596 | 0.175 | 0.175 | 0.175 | 0.175 | 0.175 |
| $\left(\dfrac{d}{f}\right)$ final | 15 | 15 | 10 | 10 | 10 | 10 | 10 |

TABLE XIII

WORK MATERIAL: Inco 718 (R$_C$ 42)    uhp: 1.87
CUTTING SPEED: 100 sfm    TOOL MATERIAL: Carbide

SIZE OF MACHINE TOOL

| | (a) | (b) | (c) | (d) | (e) | (f) | (g) |
|---|---|---|---|---|---|---|---|
| HP | 7.5 | 15.0 | 30.0 | 40.0 | 50.0 | 75.0 | 100. |
| HP × η | 6.0 | 12.0 | 24.0 | 32.0 | 40.0 | 60.0 | 80.0 |
| $\dfrac{HP \times \eta}{C_w}$ | 4.6 | 9.23 | 18.46 | 24.62 | 30.77 | 46.15 | 61.54 |
| f | 0.0117 | 0.0235 | 0.047 | 0.06269 | 0.0784 | 0.1175 | 0.1567 |
| d | 0.175 | 0.175 | 0.175 | 0.175 | 0.175 | 0.175 | 0.175 |
| $\left(\dfrac{d}{f}\right)$ | 14.96 | 7.45 | 3.72 | 2.79 | 2.23 | 1.49 | 1.12 |
| $f_{final}$ | No change required | 0.0175 | 0.0175 | 0.0175 | 0.0175 | 0.0175 | 0.0175 |
| $d_{final}$ | | 0.175 | 0.175 | 0.175 | 0.175 | 0.175 | 0.175 |
| $\left(\dfrac{d}{f}\right)$ final | | 10 | 10 | 10 | 10 | 10 | 10 |

TABLE XIV

WORK MATERIAL: Inco 718 (R$_C$ 42)    uhp: 1.87
CUTTING SPEED: 450 sfm    TOOL MATERIAL: SIALON Ceramic

SIZE OF MACHINE TOOL

| | (a) | (b) | (c) | (d) | (e) | (f) | (g) |
|---|---|---|---|---|---|---|---|
| HP | 7.5 | 15.0 | 30.0 | 40.0 | 50.0 | 75.0 | 100. |
| HP × η | 6.0 | 12.0 | 24.0 | 32.0 | 40.0 | 60.0 | 80.0 |

TABLE XIV-continued

WORK MATERIAL: Inco 718 ($R_C$ 42)  uhp: 1.87
CUTTING SPEED: 450 sfm  TOOL MATERIAL: SIALON Ceramic

| | SIZE OF MACHINE TOOL | | | | | | |
|---|---|---|---|---|---|---|---|
| | (a) | (b) | (c) | (d) | (e) | (f) | (g) |
| $\frac{HP \times \eta}{C_w}$ | 4.6 | 9.23 | 18.46 | 24.62 | 30.77 | 46.15 | 61.54 |
| f | 0.0026 | 0.0052 | 0.0104 | 0.0139 | 0.0174 | 0.0261 | 0.0348 |
| d | 0.175 | 0.175 | 0.175 | 0.175 | 0.175 | 0.175 | 0.175 |
| $\left(\frac{d}{f}\right)$ | 67.31 | 33.55 | 16.83 | 12.59 | 10.06 | 6.70 | 5.03 |
| $f_{final}$ | 0.0055 | 0.0078 | 0.01101 | No change required | No change required | 0.0175 | 0.0175 |
| $d_{final}$ | 0.0826 | 0.1168 | 0.1652 | | | 0.175 | 0.175 |
| $\left(\frac{d}{f}\right)$ final | 15 | 15 | 15 | | | 10 | 10 f |

One further iteration may be necessary depending upon whether or not the number of passes needed to remove the requisite depth of stock is a natural number. The operator can obtain the number of passes by dividing the depth of stock to be removed by the value of $d_f$. If the resulting quotient is not a natural number, then the requisite number of passes is raised to the next higher integer and a new DOC is calculated ($d_{new}$). The new feed ($f_{new}$) is requisite number of passes is raised to the next higher integer and a new DOC is calculated ($d_{new}$). The new feed ($f_{new}$) is then either $d_{new}/(d/f)_{min}$ or $d_f/d_{new}$ whichever is the smaller value, but $f_{new}$ cannot be smaller than $f_{min}$ or larger than $f_{max}$ unless in the judgment of the operator the constraint should be waived.

As stated hereinabove, the type of machining operation (i.e., rough or finish) is determinative of the feed constraint, $f_{max}$ being related to the permissible roughness of the surface produced and $f_{min}$ being dependent on the value of the minimum cut such that taking any smaller cut will result in excessive rubbing between the tool and the workpiece. The criteria for the formulas that are used to determine d take into account the size and strength of the tool, the amount of material to be removed, machine tool stiffness, available horsepower and tolerable deflection of the tool insert with respect to the workpiece under application of the cutting forces. Values of d and f are generally smaller for finishing than for roughing:

| Roughing |
|---|
| f = 0.005 to 0.050 |
| d/f = 5 to 15 |
| Finishing |
| f = .001 to 0.050 |
| d/f = 2 to 25 |

EXAMPLE

Type of Machining: Rough turning
Work Material: AISI 4340 Steel (300 Bhn)
uhp: 1.51
Tool: Carbide
Tool Specification:
 ½ in. square × 3/16 in. thick insert
 15 deg. SCEA, and
 3.64 in. nose radius
Cutting Speed: 600 sfm Machine Tool Rating $HP_m$: 7.5 hp
Machine utilization factor, $\eta$: 80%
Tool wear criterion: 0.03 inch flank wear 1. Horsepower at the spindle, $HP \times \eta$ 7.5 × 0.8 = 6.0

2. 
$$C_w = 1 + \left(0.1 \times \frac{0.03}{0.01}\right)$$
$$= 1.3$$

3. Horsepower at the cutting edge, $HP_c = 6/1.3 = 4.6$

4. DOC, $d = 0.4$ (I.C. − R) Cos SCEA
 = 0.4 (0.5 − 0.0469) Cos 15°
 = 0.175 in.

5. Feed = $HP_c/(V \times 12 \times d \times uhp)$
 = 4.6 (600 × 12 × 0.175 × 1.51)
 = 0.175 ipr 6. $(d/f) = \frac{0.175}{0.0024} = 72.92$ 7. Constraints:
 $f_{min} = 0.005$ ipr;
 $f_{max} = 0.025$ ipr
 $(d/f)_{min} = 10$;
 $(d/f)_{max} = 15$ 8. Observations:
 $f < f_{min}$, $d/f > (d/f)_{max}$
 Action: increase f to $f_{min}$ and decrease d appropriately such that the product (df) remains constant.

9. $f_i = 0.005$ ipr
 $d_i = 0.175 \times (0.0024/0.005)$
 = 0.0841 in.

10. $d_i/f_i = \frac{0.084}{0.005} = 16.8$

11. $\left(\frac{d_i}{f_i}\right) > \left(\frac{d}{f}\right)_{max}$

12. Calculate the final value of feed, $f_f$, and depth of cut, $d_f$, such that $(d_f/f_f) = (d/f)_{max}$ and $d_i f_i = d_f f_f$, using the following formula:

$$f_f = \sqrt{\frac{d_i f_i}{L}} \text{ and } d_f = \sqrt{d_i f_i L} \text{ where } L = (d/f)_{max}$$

$$f_f = \sqrt{\frac{0.084 \times 0.005}{15}}$$

$$= 0.00529 \text{ ipr}$$

$$d_f = \sqrt{0.084 \times 0.005 \times 15}$$

$$= 0.07937 \text{ in.}$$

Figure 5:
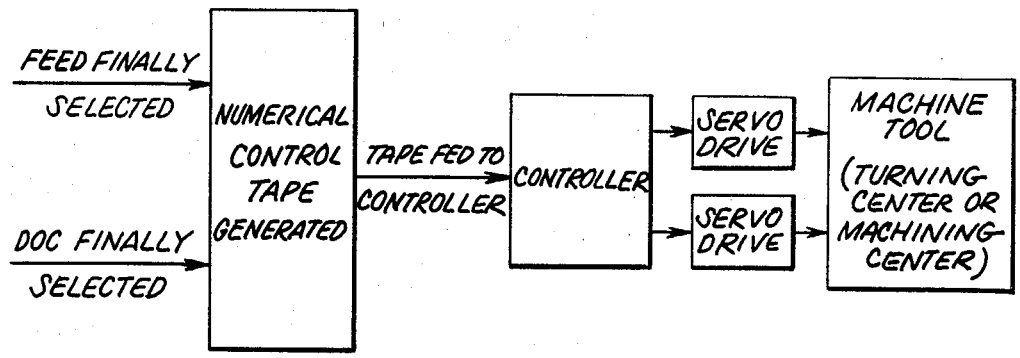
FIG. 5 is a flow diagram schematically representing the sequence by which feed and DOC adjustments are implemented in numerical control by programmed tape.

The operator having determined which values of feed and DOC to use in the given machining operation (e.g., changing workpiece dimensions to a new set of values in the making of a given part) must now adjust the machine tool accordingly. The adjustment of the feed control means and the DOC control means may be manually accomplished or these adjustments may be automatically made in the manner of the flow diagrams of FIGS. 5 and 6. In both cases a numerical control programming medium (e.g., punched paper or polyester tape) is prepared in machine language. This programmed medium may be used over and over to input directly to the controller for the production of each part (FIG. 5) or may be read one time to store the program in the memory of a computerized numerical control machine tool (FIG. 6). In the latter case the chances of errors from repeated use of a programming medium such as a punched tape are greatly reduced.

The prime advantage of the process of this invention lies in the increased utilization of machine tool capacity now available, but underutilized. Also, by enabling the machine tool operator to take part in programming the cutting conditions to be used, this invention will overcome any lack of experience in the machining process on the part of the regular programmer, the delay between program generation and production of the first part is reduced and the operator's expertise and skill in machining is more fully utilized. In addition, programming of the part by the operator (instead of by a separate part programmer) can result in significant savings in costs especially in small job shops where it may be difficult to justify a separate part-programmer.

What is claimed is:

1. The method of selecting and implementing cutting conditions for the machining of a workpiece with a machine tool employing a tool insert, said machine tool having means for adjusting feed of said tool insert and means for adjusting depth of cut of said tool insert, said method comprising the steps of:
   (a) calculating the horsepower ($HP_c$) required at the cutting edge of the tool insert,
   (b) calculating a first approximation of the value of the depth of cut (d) to be used,
   (c) calculating a first approximation of the value for the feed (f) to be used,
   (d) determining the value of the ratio d/f,
   (e) comparing the values of f and d/f to the values of preset constraints for $f_{min}$, $f_{max}$, $(d/f)_{min}$ and $(d/f)_{max}$,
   (f) if f has a value less than $f_{min}$, assigning the value of $f_{min}$ as the initial value of feed ($f_i$) and decreasing the value of d as the initial value of depth of cut ($d_i$) such that $d_i \times f_i = d \times f$,
      (1) calculating the value of ($d_i/f_i$) and
      (2) if ($d_i/f_i$) has a value greater than $(d/f)_{max}$, calculating the value of final feed ($f_f$) and the value of final depth of cut ($d_f$) from the relationships $$f_f = \sqrt{\frac{d_i \times f_i}{L}} \text{ and } d_f = \sqrt{d_i \times f_i \times L},$$

where $L = (d/f)_{max}$,
   (g) if f has a value greater than $f_{max}$, assigning the value of $f_{max}$ as the value of $f_i$ and calculating the value of ($d/f_i$),
      (1) if ($d/f_i$) has a value smaller than $(d/f)_{min}$, assigning to ($d/f_i$) the value of $(d/f)_{min}$,
      (2) calculating the value of $f_f$ from the relationship:

$f_f = d/(d/f)_{min}$ and (3) assigning to $d_f$ the value of d in the previous step,
   (h) if f has a value equal to or greater than $f_{min}$ and less than or equal to $f_{max}$ and if (d/f) has a value equal to or greater than $(d/f)_{min}$ and equal to or less than $(d/f)_{max}$, then $f_f = f$ and $d_f = d$,
   (i) repositioning said means for adjusting the feed of said tool insert with respect to said workpiece to a feed having the value of $f_f$,
   (j) repositioning said means for adjusting the depth of cut of said tool insert with respect to said workpiece to a depth of cut having the value of $d_f$ and
   (k) proceeding with the machining operation.

2. The method recited in claim 1 wherein rough machining is to be accomplished and the constraints are $f_{min} = 0.005$ ipr, $f_{max} = 0.050$ ipr, $(d/f)_{min} = 5$ and $(d/f)_{max} = 15$.

3. The method recited in claim 1 wherein finish machining is to be accomplished and the constraints are $f_{min} = 0.001$ ipr, $f_{max} = 0.050$ ipr, $(d/f)_{min} = 2$ and $(d/f)_{max} = 25$.

4. The method recited in claim 1 wherein manual repositioning of the means for adjusting feed and means for adjusting depth of cut is employed.

5. The method recited in claim 1 wherein repositioning is in response to a numerical control program.

6. The method recited in claim 5 wherein the numerical control program presented to a controller actuates a first servo drive mechanism to adjust the feed and a second servo drive mechanism to adjust the depth of cut.

7. The method recited in claim 1 wherein the machining task is selected from the group consisting of turning, boring and face milling.

8. The method of selecting and implementing cutting conditions for the machining of a workpiece with a machine tool employing a tool insert, said machine tool having means for adjusting feed of said tool insert and means for adjusting depth of cut of said tool insert, said method comprising the steps of:
   (a) calculating the horsepower ($HP_c$) required at the cutting edge of the tool insert,
   (b) calculating a first approximation of the value of the depth of cut (d) to be used,
   (c) calculating a first approximation of the value for the feed (f) to be used,
   (d) determining the value of the ratio d/f,
   (e) comparing the values of f and d/f to the values of preset constraints for $f_{min}$, $f_{max}$, $(d/f)_{min}$ and $(d/f)_{max}$, (f) if f has a value less than $f_{min}$, assigning the value of $f_{min}$ as the initial value of feed ($f_i$) and decreasing the value of d as the initial value of depth of cut ($d_i$) such that $d_i \times f_i = d \times f$,
  (1) calculating the value of ($d_i/f_i$) and
  (2) if ($d_i/f_i$) has a value greater than $(d/f)_{max}$, calculating the value of final feed ($f_f$) and the value of final depth of cut ($d_f$) from the relationships $$f_f = \sqrt{\frac{d_i \times f_i}{L}} \text{ and } d_f = \sqrt{d_i \times f_i \times L},$$

where $L = (d/f)_{max}$,
(g) if f has a value greater than $f_{max}$, assigning the value of $f_{max}$ as the value of $f_i$ and calculating the value of ($d/f_i$),
  (1) if ($d/f_i$) has a value smaller than $(d/f)_{min}$, assigning to ($d/f_i$) the value of $(d/f)_{min}$,
  (2) calculating the value of $f_f$ from the relationship:

$f_f = d/(d/f)_{min}$ and (3) assigning to $d_f$ the value of d in the previous step,
(h) if f has a value equal to or greater than $f_{min}$ and less than or equal to $f_{max}$ and if (d/f) has a value equal to or greater than $(d/f)_{min}$ and equal to or less than $(d/f)_{max}$, then $f_f = f$ and $d_f = d$,
(i) calculating the number of passes required to complete machining of thickness of stock to be removed from the workpiece using $d_f$ for each pass,
(j) if the number of passes has an integer value:
  (1) repositioning said means for adjusting the feed of said tool insert with respect to said workpiece to a feed having the value of $f_f$,
  (2) repositioning said means for adjusting the depth of cut of said tool insert with respect to said workpiece to a depth of cut having the value of $d_f$,
(k) if the number of passes does not have an integer value:
  (1) increasing the number of passes to the next larger integer, calculating the new depth of cut ($d_{new}$) required to provide said larger integer number of passes and calculating the new feed ($f_{new}$) required,
  (2) repositioning said means for adjusting the feed of said tool insert with respect to said workpiece to a feed having the value of $f_{new}$,
  (3) repositioning said means for adjusting the depth of cut of said tool insert with respect to said workpiece to a depth of cut having the value of $d_{new}$ and
(l) proceeding with the machining operation.

9. The method recited in claim 8 wherein rough machining is to be accomplished and the constraints are $f_{min} = 0.005$ ipr, $f_{max} = 0.050$ ipr, $(d/f)_{min} = 5$ and $(d/f)_{max} = 15$.

10. The method recited in claim 8 wherein finish machining is to be accomplished and the constraints are $f_{min} = 0.001$ ipr, $f_{max} = 0.050$ ipr, $(d/f)_{min} = 2$ and $(d/f)_{max} = 25$.

11. The method recited in claim 8 wherein manual repositioning of the means for adjusting feed and means for adjusting depth of cut is employed.

12. The method recited in claim 8 wherein repositioning is in response to a numerical control program.

13. The method recited in claim 12 wherein the numerical control program presented to a controller actuates a first servo drive mechanism to adjust the feed and a second servo drive mechanism to adjust the depth of cut.

14. The method recited in claim 8 wherein the machining task is selected from the group consisting of turning, boring and face milling.

* * * * *